(12) United States Patent
Mu

(10) Patent No.: US 11,107,254 B2
(45) Date of Patent: Aug. 31, 2021

(54) CALLIGRAPHY-PAINTING DEVICE, CALLIGRAPHY-PAINTING APPARATUS, AND AUXILIARY METHOD FOR CALLIGRAPHY PAINTING

(71) Applicant: BOE TECHNOLOGY GROUP CO., LTD., Beijing (CN)

(72) Inventor: Xinxin Mu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 400 days.

(21) Appl. No.: 16/088,624

(22) PCT Filed: Dec. 6, 2017

(86) PCT No.: PCT/CN2017/114769
§ 371 (c)(1),
(2) Date: Sep. 26, 2018

(87) PCT Pub. No.: WO2018/201716
PCT Pub. Date: Nov. 8, 2018

(65) Prior Publication Data
US 2021/0012540 A1    Jan. 14, 2021

(30) Foreign Application Priority Data

May 5, 2017    (CN) .......................... 201710313042.4

(51) Int. Cl.
*G06T 11/00*        (2006.01)
*G06T 7/50*         (2017.01)
(Continued)

(52) U.S. Cl.
CPC .............. *G06T 11/00* (2013.01); *G06F 3/011* (2013.01); *G06K 9/00416* (2013.01);
(Continued)

(58) Field of Classification Search
CPC ... G06T 11/00; G06T 7/50; G06T 7/70; G06F 3/011; G06K 9/00416
See application file for complete search history.

(56) References Cited

U.S. PATENT DOCUMENTS

2015/0362734 A1*  12/2015  Moser .................. G03H 1/0252
                                                                   359/3
2019/0155895 A1*  5/2019   Buckley ............. G06K 9/00416

FOREIGN PATENT DOCUMENTS

CN          102842144 A      12/2012
CN          103941866 A  *    7/2014
(Continued)

OTHER PUBLICATIONS

International Search Report of PCT/CN2017/114769 in Chinese, dated Mar. 8, 2018, with English translation.
Notice of Transmittal of the International Search Report of PCT/CN2017/114769 in Chinese, dated Mar. 8, 2018.
Written Opinion of the International Searching Authority of PCT/CN2017/114769 in Chinese, dated Mar. 8, 2018 with English translation.

*Primary Examiner* — Sarah Lhymn
(74) *Attorney, Agent, or Firm* — Collard & Roe, P.C.

(57) ABSTRACT

A calligraphy-painting device, a calligraphy-painting apparatus, and an auxiliary method for calligraphy-painting are disclosed. The calligraphy-painting device includes: a display portion, configured to display a preset calligraphy-painting information; an image acquiring portion, configured to acquire an image; and a control unit, in communication connection with the display portion, and configured to control the display portion to display the preset calligraphy-painting information, wherein the image is processed to obtain a calligraphy-painting region, and the preset calligraphy-painting information is virtually displayed in the calligraphy-painting region.

17 Claims, 7 Drawing Sheets

(51) Int. Cl.
    *G06T 7/70*           (2017.01)
    *G06F 3/01*           (2006.01)
    *G06K 9/00*          (2006.01)
    *G06K 9/32*          (2006.01)
    *G06K 9/46*          (2006.01)
    *G06K 9/62*          (2006.01)
    *G06T 7/20*           (2017.01)

(52) U.S. Cl.
    CPC ............. *G06K 9/3233* (2013.01); *G06K 9/46* (2013.01); *G06K 9/6201* (2013.01); *G06T 7/20* (2013.01); *G06T 7/50* (2017.01); *G06T 7/70* (2017.01); *G06K 2209/01* (2013.01); *G06T 2207/30241* (2013.01)

(56) References Cited

FOREIGN PATENT DOCUMENTS

| | | | |
|---|---|---|---|
| CN | 104052977 A | | 9/2014 |
| CN | 105279141 A | * | 1/2016 |
| CN | 105488544 A | | 4/2016 |
| CN | 205176802 U | | 4/2016 |
| CN | 106371593 A | * | 2/2017 |
| CN | 106371593 A | | 2/2017 |
| CN | 106373455 A | * | 2/2017 |
| CN | 106373455 A | | 2/2017 |

* cited by examiner

CALLIGRAPHY-PAINTING DEVICE, CALLIGRAPHY-PAINTING APPARATUS, AND AUXILIARY METHOD FOR CALLIGRAPHY PAINTING

CROSS REFERENCE TO RELATED APPLICATIONS

This application is the National Stage of PCT/CN2017/114769 filed on Dec. 6, 2017, which claims priority under 35 U.S.C. § 119 of Chinese Application No. 201710313042.4 filed on May 5, 2017, the disclosure of which is incorporated by reference.

TECHNICAL FIELD

At least one embodiment of the present disclosure relates to a calligraphy-painting device, a calligraphy-painting apparatus, and an auxiliary method for calligraphy-painting.

BACKGROUND

With the development of science and technology, more and more traditional industries incorporate new technical content. The learning process of calligraphy-painting basically depends on the subjective efforts of individuals. It also requires personal exploration and repeated practice during the learning process. In the process of writing, it pays attention to the writing sequence, the strength of writing, the pause and other aspects.

SUMMARY

The calligraphy-painting device applies an augmented reality (AR) technology to enable the user to copy a preset calligraphy-painting information virtually displayed in the calligraphy-painting region. During repeated practice, the practice experience and effect are improved, and the level of calligraphy-painting of the user can be quickly improved.

At least one embodiment of the present embodiment provides a calligraphy-painting device, including: a display portion, configured to display a preset calligraphy-painting information; an image acquiring portion, configured to acquire an image in front of a user; and a control unit, in communication connection with the display portion, and configured to control the display portion to display the preset calligraphy-painting information, wherein the image in front of the user is processed to obtain a calligraphy-painting region, image light displayed by the display portion is transmitted to an eye of the user and the preset calligraphy-painting information is virtually displayed in the calligraphy-painting region.

For example, in the calligraphy-painting device provided by an example of the present embodiment, the control unit is in communication connection with the image acquiring portion, and the control unit includes a recognition module configured to process the image acquired by the image acquiring portion to obtain the calligraphy-painting region.

For example, in the calligraphy-painting device provided by an example of the present embodiment, the recognition module is further configured to recognize a calligraphy-painting sub region in the calligraphy-painting region according to the image, the control unit is further configured to control the display portion to virtually display a sub image of the preset calligraphy-painting information in the calligraphy-painting sub region.

For example, in the calligraphy-painting device provided by an example of the present embodiment, the recognition module is further configured to recognize a first character written by the user according to the image, and the control unit is further configured to control the display portion to virtually display the preset calligraphy-painting information at a preset position in the calligraphy-painting region around the first character.

For example, in the calligraphy-painting device provided by an example of the present embodiment, the image acquiring portion is further configured to acquire a depth image of a pen tip used by the user, and the recognition module is further configured to recognize a change of three dimensional coordinates of the pen tip during a movement process according to the depth image, so that the control unit extracts an effective handwriting information, the effective handwriting information is a movement trajectory of the pen tip upon a distance between the pen tip and a writing carrier in the calligraphy-painting region being zero, and the movement trajectory is in a predetermined region in the calligraphy-painting region.

For example, in the calligraphy-painting device provided by an example of the present embodiment, the control unit is in communication connection with the image acquiring portion, the control unit includes a recognition circuit, and the recognition circuit is configured to process the image acquired by the image acquiring portion to obtain the calligraphy-painting region.

For example, in the calligraphy-painting device provided by an example of the present embodiment, the recognition circuit is further configured to recognize a calligraphy-painting sub region in the calligraphy-painting region according to the image, and the control unit is further configured to control the display portion to virtually display a sub image of the preset calligraphy-painting information in the calligraphy-painting sub region.

For example, in the calligraphy-painting device provided by an example of the present embodiment, the recognition circuit is further configured to recognize a first character written by the user according to the image, and the control unit is further configured to control the display portion to virtually display the preset calligraphy-painting information at a preset position in the calligraphy-painting region around the first character.

For example, in the calligraphy-painting device provided by an example of the present embodiment, the image acquiring portion is further configured to acquire a depth image of a pen tip used by the user, and the recognition circuit is further configured to recognize a change of three dimensional coordinates of the pen tip during a movement process according to the depth image, so that the control unit extracts an effective handwriting information, the effective handwriting information is a movement trajectory of the pen tip upon a distance between the pen tip and a writing carrier in the calligraphy-painting region being zero, and the movement trajectory is in a predetermined region in the calligraphy-painting region.

For example, in the calligraphy-painting device provided by an example of the present embodiment, the control unit is in communication connection with the image acquiring portion, the image acquiring portion includes a recognition module configured to process the image to obtain the calligraphy-painting region.

For example, in the calligraphy-painting device provided by an example of the present embodiment, the recognition module is further configured to recognize a calligraphy-painting sub region in the calligraphy-painting region according to the image, the control unit is further configured to control the display portion to virtually display a sub image of the preset calligraphy-painting information in the calligraphy-painting sub region.

For example, in the calligraphy-painting device provided by an example of the present embodiment, the recognition module is further configured to recognize a first character written by the user according to the image, and the control unit is further configured to control the display portion to virtually display the preset calligraphy-painting information at a preset position in the calligraphy-painting region around the first character.

For example, in the calligraphy-painting device provided by an example of the present embodiment, the image acquiring portion is further configured to acquire a depth image of a pen tip used by the user, and the recognition module is further configured to recognize a change of three dimensional coordinates of the pen tip during a movement process according to the depth image and send the change to the control unit to extract an effective handwriting information, the effective handwriting information is a movement trajectory of the pen tip upon a distance between the pen tip and a writing carrier in the calligraphy-painting region being zero, and the movement trajectory is in a predetermined region in the calligraphy-painting region.

For example, in the calligraphy-painting device provided by an example of the present embodiment, the control unit is in communication connection with the image acquiring portion, the image acquiring portion includes a recognition circuit, and the recognition circuit is configured to process the image acquired by the image acquiring portion to obtain the calligraphy-painting region.

For example, in the calligraphy-painting device provided by an example of the present embodiment, the recognition circuit is further configured to recognize a calligraphy-painting sub region in the calligraphy-painting region according to the image, and the control unit is further configured to control the display portion to virtually display a sub image of the preset calligraphy-painting information in the calligraphy-painting sub region.

For example, in the calligraphy-painting device provided by an example of the present embodiment, the recognition circuit is further configured to recognize a first character written by the user according to the image, and the control unit is further configured to control the display portion to virtually display the preset calligraphy-painting information at a preset position in the calligraphy-painting region around the first character.

For example, in the calligraphy-painting device provided by an example of the present embodiment, the image acquiring portion is further configured to acquire a depth image of a pen tip used by the user, and the recognition circuit is further configured to recognize a change of three dimensional coordinates of the pen tip during a movement process according to the depth image and send the change to the control unit to extract an effective handwriting information, the effective handwriting information is a movement trajectory of the pen tip upon a distance between the pen tip and a writing carrier in the calligraphy-painting region being zero, and the movement trajectory is in a predetermined region in the calligraphy-painting region.

For example, the calligraphy-painting device provided by an example of the present embodiment further includes a recognition module, wherein the recognition module is respectively in communication connection with the image acquiring portion and the control unit, and the recognition module is configured to process the image acquired by the image acquiring portion to obtain the calligraphy-painting region.

For example, in the calligraphy-painting device provided by an example of the present embodiment, the recognition module is further configured to recognize a calligraphy-painting sub region in the calligraphy-painting region according to the image, the control unit is further configured to control the display portion to virtually display a sub image of the preset calligraphy-painting information in the calligraphy-painting sub region.

For example, in the calligraphy-painting device provided by an example of the present embodiment, the recognition module is further configured to recognize a first character written by the user according to the image, and the control unit is further configured to control the display portion to virtually display the preset calligraphy-painting information at a preset position in the calligraphy-painting region around the first character.

For example, in the calligraphy-painting device provided by an example of the present embodiment, the image acquiring portion is further configured to acquire a depth image of a pen tip used by the user, and the recognition module is further configured to recognize a change of three dimensional coordinates of the pen tip during a movement process according to the depth image and send the change to the control unit to extract an effective handwriting information, the effective handwriting information is a movement trajectory of the pen tip upon a distance between the pen tip and a writing carrier in the calligraphy-painting region being zero, and the movement trajectory is in a predetermined region in the calligraphy-painting region.

For example, the calligraphy-painting device provided by an example of the present embodiment further includes a recognition circuit, wherein the recognition circuit is respectively in communication connection with the image acquiring portion and the control unit, and the recognition circuit is configured to process the image acquired by the image acquiring portion to obtain the calligraphy-painting region.

For example, in the calligraphy-painting device provided by an example of the present embodiment, the recognition circuit is further configured to recognize a calligraphy-painting sub region in the calligraphy-painting region according to the image, and the control unit is further configured to control the display portion to virtually display a sub image of the preset calligraphy-painting information in the calligraphy-painting sub region.

For example, in the calligraphy-painting device provided by an example of the present embodiment, the recognition circuit is further configured to recognize a first character written by the user according to the image, and the control unit is further configured to control the display portion to virtually display the preset calligraphy-painting information at a preset position in the calligraphy-painting region around the first character.

For example, in the calligraphy-painting device provided by an example of the present embodiment, the image acquiring portion is further configured to acquire a depth image of a pen tip used by the user, and the recognition circuit is further configured to recognize a change of three dimensional coordinates of the pen tip during a movement process according to the depth image and send the change to the control unit to extract an effective handwriting information, the effective handwriting information is a movement trajectory of the pen tip upon a distance between the pen tip and a writing carrier in the calligraphy-painting region being zero, and the movement trajectory is in a predetermined region in the calligraphy-painting region.

For example, in the calligraphy-painting device provided by an example of the present embodiment, the control unit is further configured to highlight a next stroke of the user according to the effective handwriting information.

For example, in the calligraphy-painting device provided by an example of the present embodiment, the control unit is further configured to judge and give a score according to a matching degree between the preset calligraphy-painting information and the effective handwriting information, and send a display signal of the score to the display portion to display the score.

For example, the calligraphy-painting device provided by an example of the present embodiment further includes: an external interface, in communication connection with the control unit, wherein the control unit is further configured to judge and give a score according to a matching degree between the preset calligraphy-painting information and the effective handwriting information and send a signal of the score to the external interface.

For example, the calligraphy-painting device provided by an example of the present embodiment further includes: a memory, wherein at least one of the preset calligraphy-painting information and the effective handwriting information is stored in the memory.

For example, in the calligraphy-painting device provided by an example of the present embodiment, the control unit is further configured to analyze the score to classify each stroke written by the user.

For example, in the calligraphy-painting device provided by an example of the present embodiment, the display portion includes: a projection component and a transflective component, wherein the projection component projects the preset calligraphy-painting information displayed by the display portion to the transflective component, and the transflective component reflects image light of the preset calligraphy-painting information projected by the projection component into the eye of the user.

At least one embodiment of the present disclosure provides a calligraphy-painting apparatus, including: a head wearing portion; and a calligraphy-painting device, located on the head wearing portion, wherein the calligraphy-painting device includes the calligraphy-painting device provided by any one of embodiments of the present disclosure.

At least one embodiment of the present disclosure provides an auxiliary method for calligraphy-painting, including: acquiring an image in front of a user; recognizing a calligraphy-painting region according to the image; transmitting image light of a preset calligraphy-painting information to an eye of the user and virtually displaying the preset calligraphy-painting information in the calligraphy-painting region.

For example, the auxiliary method for calligraphy-painting provided by an example of the present embodiment further includes: recognizing a calligraphy-painting sub region of the calligraphy-painting in the calligraphy-painting region according to the image; and virtually displaying a sub image of the preset calligraphy-painting information in the calligraphy-painting sub region.

For example, the auxiliary method for calligraphy-painting provided by an example of the present embodiment further includes: recognizing a first character written by the user according to the image; and virtually displaying the preset calligraphy-painting information at a preset position in the calligraphy-painting region around the first character.

For example, the auxiliary method for calligraphy-painting provided by an example of the present embodiment further includes: acquiring a depth image of a pen tip in front of the user; and recognizing a change of three dimensional coordinates of the pen tip during a movement process according to the depth image to extract an effective handwriting information, wherein the effective handwriting information is a movement trajectory of the pen tip upon a distance between the pen tip and a writing carrier in the calligraphy-painting region being zero, and the movement trajectory is in a predetermined region in the calligraphy-painting region.

For example, the auxiliary method for calligraphy-painting provided by an example of the present embodiment further includes: highlighting a next stroke of the user according to the effective handwriting information.

For example, the auxiliary method for calligraphy-painting provided by an example of the present embodiment further includes: judging and giving a score according to a matching degree between the preset calligraphy-painting information and the effective handwriting information.

For example, the auxiliary method for calligraphy-painting provided by an example of the present embodiment further includes: projecting the score or outputting the score.

For example, the auxiliary method for calligraphy-painting provided by an example of the present embodiment further includes: analyzing the score to classify writing conditions of each stroke written by the user.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

Figure 1A:
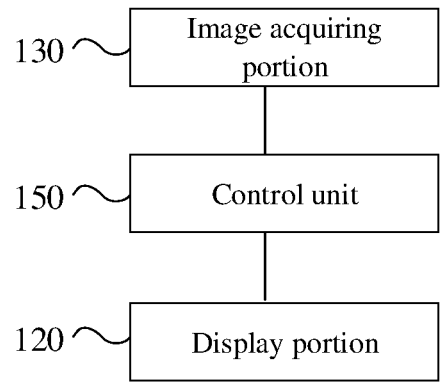
FIGS. 1a-1e are schematic diagrams of a calligraphy-painting device provided by an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, a person having ordinary skill in the art can obtain other embodiment(s), without any inventive work, which should be within the scope of the disclosure.

Unless otherwise defined, all the technical and scientific terms used herein have the same meanings as commonly understood by a person having ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

In the study, inventor(s) of the present application has found that: in the autonomous practice of calligraphy and painting, it is likely to have a problem that objective evaluation and guidance opinions cannot be obtained only by subjective judgment by a user. Besides, in the practice of calligraphy, it is very easy to write strokes in a wrong order.

Embodiments of the present disclosure provide a calligraphy-painting device, a calligraphy-painting apparatus, and an auxiliary method for calligraphy-painting. The calligraphy-painting device includes a display portion, an image acquiring portion, and a control unit. The display portion is configured to display a preset calligraphy-painting information; the image acquiring portion is configured to acquire an image in front of a user; the control unit is in communication connection with the display portion, and the control unit is configured to control the display portion to display the preset calligraphy-painting information, and the image in front of the user is processed to obtain a calligraphy-painting region, image light displayed by the display portion is transmitted to eyes of the user and the preset calligraphy-painting information is virtually displayed in the calligraphy-painting region. The calligraphy-painting device utilizes an enhanced display technology to able the user to copy the preset painting information virtually displayed in the calligraphy-painting region, thereby improving practice effect during repeating practice, and improving the level of calligraphy and painting of the user.

Hereafter, the calligraphy-painting device, the calligraphy-painting equipment and the auxiliary method for calligraphy-painting provided by the embodiments of the present disclosure will be described with reference to the accompanying drawings.

An embodiment of the present disclosure provides a calligraphy-painting device. FIGS. 1a-1e are schematic diagrams of a calligraphy-painting device provided by the present embodiment. As illustrated by FIG. 1a, the calligraphy-painting device includes a display portion 120, an image acquiring portion 130, and a control unit 150. The display portion 120 in the calligraphy-painting device is configured to display a preset calligraphy-painting information in front of a user; the image acquiring portion 130 is configured to acquire an image in front of the user; the control unit 150 is in communication connection with the display portion 120 and the control unit 150 is configured to control the display portion 120 to display the preset calligraphy-painting information, the image in front of the user is processed to obtain a calligraphy-painting region, image light displayed by the display portion 120 is transmitted to eyes of the user, and a virtual image of the preset calligraphy-painting information is virtually displayed in the calligraphy-painting region. The virtual image of the preset calligraphy-painting information refers to a virtual image of the preset calligraphy-painting information displayed on the display portion, which is seen by the eyes of the user using the calligraphy-painting device.

Figure 1B:
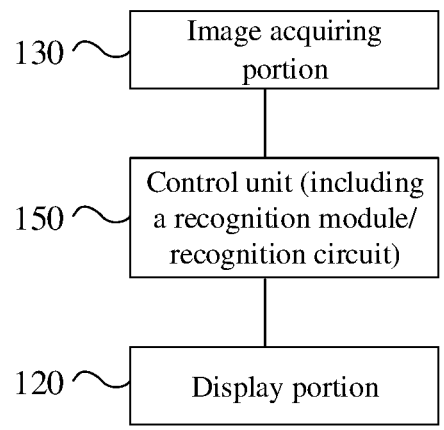

For example, as illustrated by FIG. 1b, in an example of the present embodiment, the control unit 150 is in communication connection with the image acquiring portion 130. The control unit 150 includes a recognition module or a recognition circuit. The recognition module or the recognition circuit is configured to process the image acquired by the acquiring unit 130 to obtain the calligraphy-painting region.

Figure 1C:
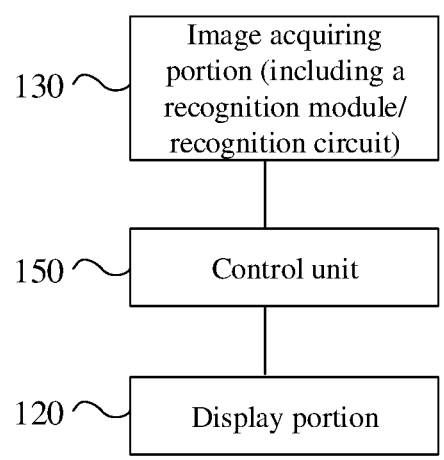

For example, as illustrated by FIG. 1c, in an example of the present embodiment, the control unit 150 is in communication connection with the image acquiring portion 130, the image acquiring portion 130 includes a recognition module or a recognition circuit, and the recognition module or the recognition circuit is configured to process the image acquired by the acquiring unit 130 to obtain the calligraphy-painting region.

Figure 1D:
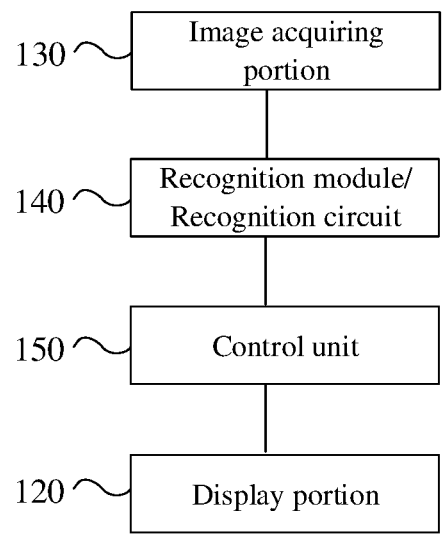

For example, as illustrated by FIG. 1d, in an example of the present embodiment, the calligraphy-painting device further includes a recognition module or a recognition circuit 140. The recognition module or the recognition circuit 140 is in communication connection with the image acquiring portion 130 and the control unit 150, respectively, and the recognition module or the recognition circuit 140 is configured to process the image acquired by the image acquiring portion 130 to obtain the calligraphy-painting region.

The abovementioned recognition module refers that the recognition function is implemented by a software algorithm, so as to be executed by various types of processors. For example, considering the level of the existing hardware process, the recognition module can be a module implemented by a software algorithm.

The abovementioned recognition circuit refers to that the recognition function is implemented by hardware. Without considering the cost, a person having ordinary skill in the art can build a corresponding hardware circuit to realize the recognition function. For example, the hardware circuit includes a conventional Very Large Scale Integration (VLSI) circuit or a gate array and existing semiconductors such as a logic chip, a transistor, or other discrete elements. For example, the recognition circuit can also be implemented by a programmable hardware device such as a field programmable gate array, a programmable array logic, a programmable logic device, etc., but the present embodiment is not limited thereto.

In the calligraphy-painting device provided by the present embodiment, the calligraphy-painting region is acquired and recognized by the image acquiring portion and the recognition module or the recognition circuit, and then the preset calligraphy-painting information is displayed through the control unit and the display portion, so that the user can see virtual image of the preset calligraphy-painting information in the calligraphy-painting region. Thus, augmented reality (AR) of the preset calligraphy-painting information and the real scene can be achieved. The calligraphy-painting device uses an augmented reality (AR) technology to enable the user to copy the virtual image of the preset calligraphy-painting information virtually displayed in the calligraphy-painting region. During repeated practice, the practice experience and effect are improved, the learning pleasure is increased, and the level of calligraphy-painting of the user can be quickly improved.

The above "communication connection" is represented by a connecting straight line in the figures, and refers to that data information can be transmitted or received mutually.

For example, the recognition module or the recognition circuit 140 shown in FIG. 1d receives an image signal transmitted by the image acquiring portion 130, the control unit 150 receives a data signal of the recognition module or the recognition circuit 140, and the control unit 150 transmits a display signal or the like to the display portion 120. The "communication connection" can include a wired manner (for example, connection using a cable or an optical fiber) and a wireless manner (for example, connection using a wireless network such as wifi). Furthermore, the user herein refers to a person who is using the calligraphy-painting device.

For example, the preset calligraphy-painting information includes a calligraphy-painting image, for example, an image of calligraphy and painting. For example, the calligraphy may include many kinds of standard fonts such as regular script, song typeface, cursive script, and official script, or national scripts, etc. The painting can include various painting types such as sketch, line drawing, and meticulous painting, but the present embodiment is not limited thereto.

For example, the image acquiring portion 130 can include a miniature camera, for example, a miniature depth camera, configured for acquiring a depth image of an object in the view of the user. The depth image may also be referred to as a distance image, which refers to an image including a distance (depth) from the depth camera to each point in the acquired scene. The present embodiment includes but is not limited thereto.

For example, the control unit 150 can be implemented by software, so as to be executed by various types of processors. For example, the control unit 150 can be a module implemented by software in consideration of the level of the existing hardware process. Without considering the cost, a person having skilled in the art can build a corresponding hardware circuit to realize the corresponding functions. The hardware circuit includes a conventional VLSI circuit or a gate array and existing semiconductors such as a logic chip, a transistor, or other discrete elements. For example, the control unit 150 can also be implemented by a programmable hardware device such as a field programmable gate array, a programmable array logic, a programmable logic device, etc., but the present embodiment is not limited thereto.

Figure 1E:
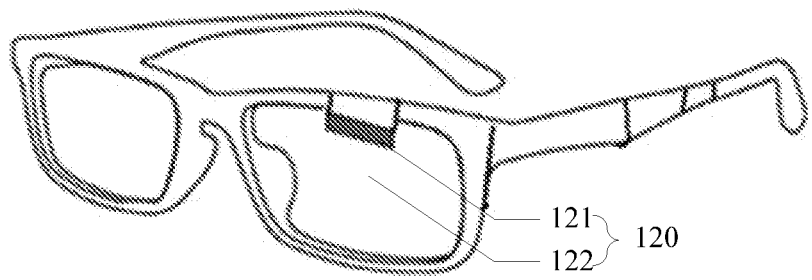

For example, as illustrated by FIG. 1e, the display portion 120 includes a projection component 121 and a transflective component 122. The projection component 121 projects a calligraphy-painting image corresponding to the preset calligraphic information to be displayed on the display portion 120 onto the transflective component 122. The transflective component 122 is configured to reflect image light of the calligraphy-painting image projected by the projection component 121 into the eyes of the user, so that the human eye can see a virtual image of the calligraphy-painting image; the transflective component 122 can also transmit the calligraphy-painting region, so that the calligraphy-painting region can enter the eyes of the user. Therefore, the user can not only see the virtual image of the calligraphy-painting image, but also see the calligraphy-painting region through the transflective component. The user can see that the virtual image of the calligraphy-painting image is virtually displayed in the calligraphy-painting region.

For example, the transflective component 122 can include a transflective lens, the present embodiment includes but is not limited thereto. FIG. 1e schematically shows that the projection component is located above the transflective component, which is not limited in the present embodiment. For example, the projection component can also be located at other positions of the transflective component as long as the projection component can project the calligraphy-painting image to be displayed on the display portion onto the transflective component.

Figure 2A:
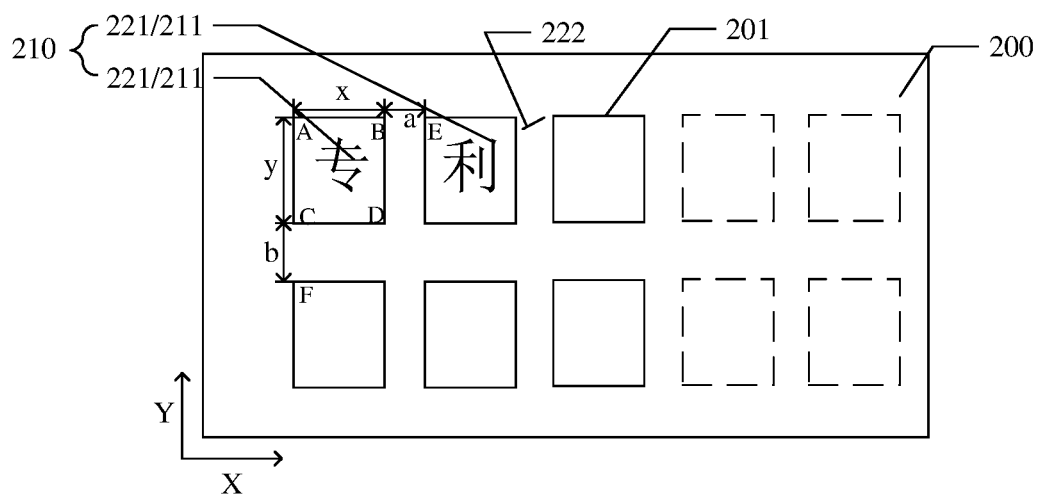
FIG. 2a is a schematic diagram of a calligraphy-painting region viewed through a display portion of the calligraphy-painting device provided by an embodiment of the present disclosure.

For example, FIG. 2a is a schematic diagram of a calligraphy-painting region viewed through a display portion of a calligraphy-painting device provided by the present embodiment. In an example of the present embodiment, as illustrated by FIG. 1b and FIG. 2a, the recognition module or the recognition circuit included in the control unit 150 is further configured to recognize a calligraphy-painting sub region 201 in the calligraphy-painting region 200 according to the image acquired by the image acquiring portion 130. FIG. 2a schematically illustrates a case of practicing calligraphy as an example. In FIG. 2a, the calligraphy-painting sub region 201 is illustrated as a frame pattern. The present embodiment includes but is not limited thereto.

For example, in an example of the present embodiment, as illustrated by FIG. 1c and FIG. 2a, the recognition module or the recognition circuit included in the image acquiring portion 130 is further configured to recognize a calligraphy-painting sub region 201 in the calligraphy-painting region 200 according to the image acquired by image acquiring portion 130.

For example, in an example of the present embodiment, as illustrated by FIG. 1d and FIG. 2a, the recognition module or the recognition circuit 140 is further configured to recognize a calligraphy-painting sub region 201 in the calligraphy-painting region 200 according to the image acquired by image acquiring portion 130.

For example, the calligraphy-painting sub region 201 can also be shown as other patterns, for example, the calligraphy-painting sub region 201 can include a shadow square or a blank square, as long as it can be recognized by the recognition module or the recognition circuit. For example, upon the recognition module or the recognition circuit recognizing an outer frame with four orthogonal angles, it can be determined that the current region is the calligraphy-painting sub region 201 (frame pattern), upon the recognition module or the recognition circuit recognizing that at least N (N can be set according to the practical requirement, for example, N>2) calligraphy-painting sub regions 201 are repeated, it is determined that the current region is the calligraphy-painting region 200 including the calligraphy-painting sub regions 201.

For example, as illustrated by FIG. 2a, after the recognition module or the recognition circuit recognizes the calligraphy-painting sub region 201 in the calligraphy-painting region 200, the recognition module or the recognition circuit sends a data signal to the control unit. The control unit virtually displays a virtual image 211 of a sub image included by the virtual image 210 of the calligraphy-painting image in the calligraphy-painting sub region 201.

Figure 2B:
FIG. 2b is a schematic diagram of a copying process of a user provided by an embodiment of the present disclosure.

For example, FIG. 2b is a schematic diagram of a copying process of a user provided by the present embodiment. As illustrated by FIG. 2a and FIG. 2b, the user copies the virtual image 211 of the sub image of the calligraphy-painting image to practice calligraphy. For example, each calligraphy-painting sub region 201 is a word frame, the sub image is an image of a character, and the user can copy the image (virtual image) of the character displayed in the word frame.

For example, in an example of the present embodiment, as illustrated by FIG. 1b and FIG. 2b, the image acquiring portion 130 is further configured to acquire a depth image of a pen tip 301 used by the user, and the recognition module or the recognition circuit included in the control unit 150 is further configured to recognize a position of the pen tip 301 according to the depth image.

For example, in an example of the present embodiment, as illustrated by FIG. 1c and FIG. 2b, the image acquiring portion 130 is further configured to acquire a depth image of a pen tip 301 used by the user, and the recognition module or the recognition circuit included in the image acquiring portion 130 is further configured to recognize a position of the pen tip 301 according to the depth image.

For example, in an example of the present embodiment, as illustrated by FIG. 1d and FIG. 2b, the image acquiring portion 130 is further configured to acquire a depth image of a pen tip 301 used by the user, and the recognition module or the recognition circuit 140 is further configured to recognize a position of the pen tip 301 according to the depth image.

For example, the recognition module or the recognition circuit analyzes the depth image and locks the pen tip upon recognizing that there is a pen tip shape in the calligraphy-painting region. For example, the recognition module or the recognition circuit can lock the pen tip 301 which is tilted in a hand of the user, and then track and record the movement trajectory of the pen tip 301.

For example, as illustrated by FIG. 2a and FIG. 2b, a process of recognizing the position of the pen tip 301 includes: recognizing a change of three dimensional coordinates of the pen tip 301 during a movement process. For example, the calligraphy-painting sub region 201 has a rectangular shape, a length of each calligraphy-painting sub region 201 in the X direction is x, a length of each calligraphy-painting sub region 201 in the Y direction is y, an interval between adjacent calligraphy-painting sub regions 201 in the X direction is a, and an interval between adjacent calligraphy-painting sub regions 201 in the Y direction is b. A direction extending upward along a vertical direction of the calligraphy-painting region 200 is Z direction (as illustrated by FIG. 2b). The present embodiment is described by taking a case where a coordinate along the Z direction of a plane where the calligraphy-painting region 200 is located is $Z=0$ as an example, the plane where the calligraphy-painting region 200 is located is also a plane where the writing carrier 300 is located.

For example, as illustrated by FIG. 2a and FIG. 2b, the coordinates of positions of the orthogonal angles of the calligraphy-painting sub region 201 are respectively A (x1, y1, 0), B (x1+x, y1, 0), C (x1, y1+y, 0), D (x1+x, y1+y, 0), E (x1+x+a, y1, 0), and F (x1, y1+y+b, 0), because the virtual image 211 of the sub image of the calligraphy-painting image is virtually displayed in the calligraphy-painting sub region 201, upon the coordinates (x0, y0, z0) of the pen tip 301 satisfying $x1 \leq x0 \leq x1+x$, $y1 \leq y0 \leq y1+y$, $z0=0$, the movement trajectory of the pen tip 301 can be extracted as an effective handwriting information 221, and the movement trajectory of the pen tip 301 outside the abovementioned range is an invalid handwriting information 222.

In the present embodiment, the effective handwriting information is a movement trajectory of the pen tip upon the distance between the pen tip and the writing carrier in the calligraphy-painting region being zero, and the movement trajectory falls into a predetermined region in the calligraphy-painting region, for example, the calligraphy-painting sub region. The abovementioned limitation that limiting the movement trajectory of the effective handwriting information within the calligraphy-painting sub region is to eliminate miswriting strokes, so as to better judge the writing conditions in the calligraphy-painting sub region (for example, a word frame). However, the miswriting strokes outside the calligraphy-painting sub region can also be regarded as a defect of calligraphy-painting. Therefore, the predetermined region for judging the effective handwriting information is not limited to the calligraphy-painting sub region, but can also be the entire calligraphy-painting region, or any part of the calligraphy-painting region.

For example, the control unit is further configured to highlight a next stroke of the user according to the position of the pen tip, i.e., the effective handwriting information. For example, the control unit can be configured that: in a process of extracting the effective handwriting information of the movement trajectories of the pen tip stored by the recognition module or recognition circuit, the completed stroke in the currently written character is weakened or not displayed, and the next stroke to be written is highlighted (e.g., brightened, bolded, flickering) to remind the user of the next stroke, thereby achieving correcting the writing sequence and preventing the user from writing with a wrong sequence.

Figure 2C:
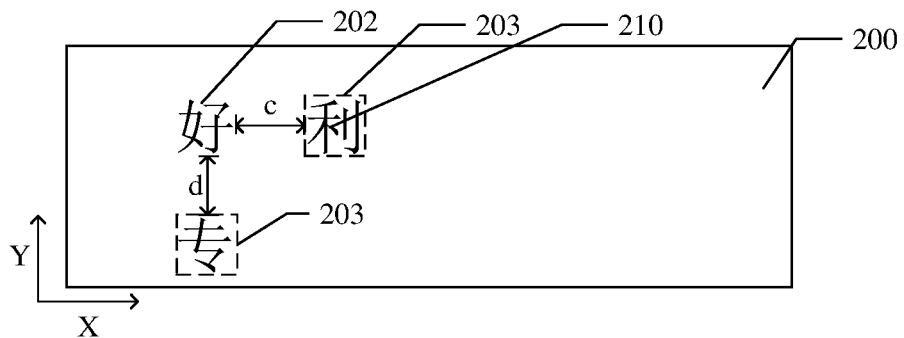
FIG. 2c is a schematic diagram of another calligraphy-painting region viewed through a display portion of a calligraphy-painting device provided by an embodiment of the present disclosure.

For example, FIG. 2c is a schematic diagram of another calligraphy-painting region viewed through a display portion of a calligraphy-painting device according to the present embodiment. As illustrated by FIG. 2c, the present example is described by taking a case where the user performs calligraphy practice as an example. In a case where the calligraphy-painting region 200 is not provided with the calligraphy-painting sub region (for example, a word frame) therein, the recognition module or the recognition circuit is further configured to recognize a first character 202 written by the user according to the image provided by the image acquiring portion. For example, the first character 202 can be any character, such as the "好" shown in FIG. 2c. The present embodiment includes but is not limited to this. For example, the first character 202 can also include special characters (for example, "X", or "Δ", etc.). After the recognition module or the recognition circuit recognizes the first character 202 written by the user, the recognition module or the recognition circuit transmits the data signal to the control unit, and the control unit sets a preset position 203 around the first character 202, i.e., a position of a dashed box shown in FIG. 2c, and then the control unit virtually displays the virtual image 210 of the calligraphy-painting image at the preset position 203 around the first character 202, i.e., the control unit virtually displays the virtual image 210 of the calligraphy-painting image within the dashed box. For example, a distance between the preset position 203 and the first character 202 in the X direction (a lateral direction) is c, and a distance between the preset position 203 and the first character 202 in the Y direction (a vertical direction) is d. Two preset positions 203 are schematically illustrated in the present embodiment, but the user can set the number and positions of the preset positions 203 according to the practical requirements.

Figure 2D:
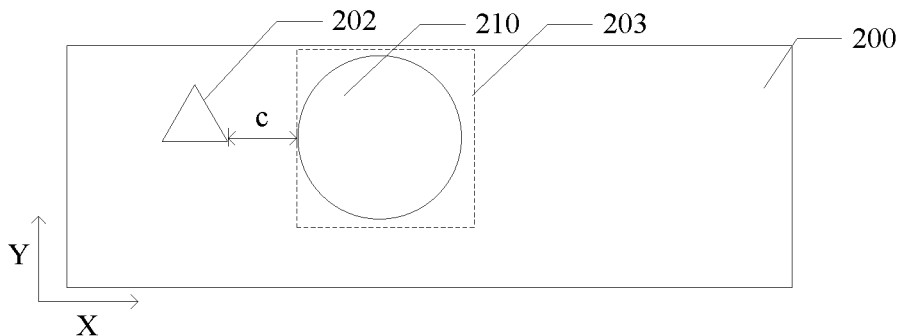
FIG. 2d is a schematic diagram of another calligraphy-painting region viewed through a display portion of a calligraphy-painting device provided by an embodiment of the present disclosure.

For example, FIG. 2d is a schematic diagram of another calligraphy-painting region viewed through a display portion of a calligraphy-painting device provided by the present embodiment. As illustrated by FIG. 2d, the present example is described by taking a case where the user performs painting practice as an example. In a case where the calligraphy-painting region 200 is not provided with the calligraphy-painting sub region (for example, a word frame) therein, the recognition module or the recognition circuit is further configured to recognize a first character 202 written by the user according to the image provided by the image acquiring portion. For example, the first character 202 can include special characters, for example, "A", or "X". After the recognition module or the recognition circuit recognizes the first character 202 written by the user, the recognition module or the recognition circuit transmits the data signal to the control unit, and the control unit sets a preset position 203 (a dashed box shown in FIG. 2d) around the first character 202, and then the control unit virtually displays the virtual image 210 of the calligraphy-painting image (for example, a "circle" shown in FIG. 2d) at the preset position 203 around the first character 202. For example, a distance between the preset position 203 and the first character 202 in the X direction (a lateral direction) is c, but the present embodiment is not limited thereto, the user can set the number and positions of the preset positions 203 according to the practical requirements.

In a case where a calligraphy-painting skill of the user is poor, the calligraphy-painting region can also include patterns for defining the calligraphy-painting sub regions. The control unit virtually displays the virtual image of the sub image of the calligraphy-painting image in the pattern of the calligraphy-painting sub region to assist and strengthen the practice of the user for each sub image of calligraphy-painting image. In addition, the abovementioned recognition module or recognition circuit can be the same recognition module or recognition circuit, or can be divided into multiple recognition modules or recognition circuits to respectively recognize the pen tip, the calligraphy-painting sub region and the first character, and then transmit signals to the control unit.

Figure 3A:
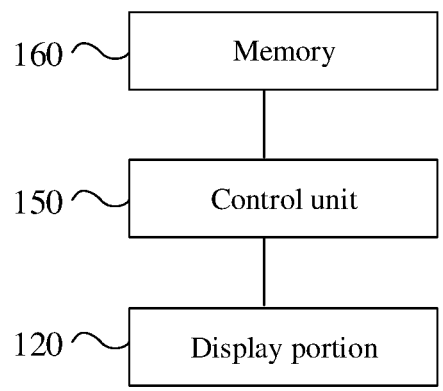
FIG. 3a is a schematic diagram of a calligraphy-painting device performing smart scoring and displaying provided by an embodiment of the present disclosure.

For example, the calligraphy-painting device according to some embodiments further includes a memory 160. FIG. 3a is a schematic diagram of a calligraphy-painting device performing smart scoring and displaying provided by the present embodiment. As illustrated by FIG. 3a, the calligraphy-painting device further includes a memory 160, and the control unit 150 is in communication connection with the memory 160, so as to read at least one of the calligraphy-painting image corresponding to the preset calligraphy-painting information and the effective writing information which are and stored in the memory 160. For example, a data of the calligraphy-painting image can be a data of a copybook that the user wants to copy. The control unit 150 judges and gives a score according to a matching degree between the calligraphy-painting image and the effective handwriting information. The present embodiment is described by taking a case where the calligraphy-painting image and the effective handwriting information are stored in the same memory as an example. The present embodiment includes but is not limited thereto. For example, the calligraphy-painting image and the effective handwriting information can also be separately stored in two memories, and the control unit is in communication connection with the two memories, respectively, so as to read the calligraphy-painting image and the effective handwriting information.

For example, the present example is described by taking a case where the calligraphy-painting image is a calligraphy copybook as an example. After reading the calligraphy-painting image and the effective handwriting information, the control unit can compare each handwriting in the effective handwriting information with each character in the calligraphy copybook, and can give a score according to the matching degree between the two. The "matching degree" here refers to a degree of coincidence between each handwriting and each character in the calligraphy copybook. For example, upon the matching degree being between 80% and 85%, the score of the user can be set as 80 points; upon the matching degree being between 85% and 90%, the score of the user can be set as 85 points; upon the matching degree being between 90% and 95%, the score of the user can be set as 90 points, and upon the matching degree being between 95% and 100%, the score of the user can be set as 100 points, etc., the present embodiment is not limited thereto, the user can set the relationship between the score and matching degree according to their own conditions.

For example, by dividing strokes of each handwriting in the effective handwriting information, it is also possible to give a score according to the degree of coincidence of each stroke in the effective handwriting information and each stroke in the calligraphy-painting image, and then take an average score of the scores of the strokes. For example, the scoring process of the stroke includes: the control unit divides the stroke into several categories according to the strokes of the common characters, such as: horizontal stroke (—), vertical stroke (丨), leftfalling stroke (丿), rightfalling stroke (㇏), horizontal hook stroke (⁀), and horizontal leftfalling stroke (⁊), etc. Upon the user completing the writing of one character, the control unit records the scores of strokes, and records the historical scores of the last N times (such as 100 or 1000 times) of each stroke, so as to obtain a historical score curve and compare the different strokes, thereby helping the user get their own calligraphy conditions.

For example, as illustrated by FIG. 3a, the control unit 150 is further configured to send a display signal of the score to the display portion 120 to display a score result. For example, the score can be set to be displayed for each character, displayed as an average score of one line of characters, or displayed as an average score of one page of characters according to the habit of the user. The score is displayed by the display portion to be presented in front of the eyes of the user. No matter what kinds of the score is displayed, the control unit will compare and give a score for each character, and record the score.

Figure 3B:
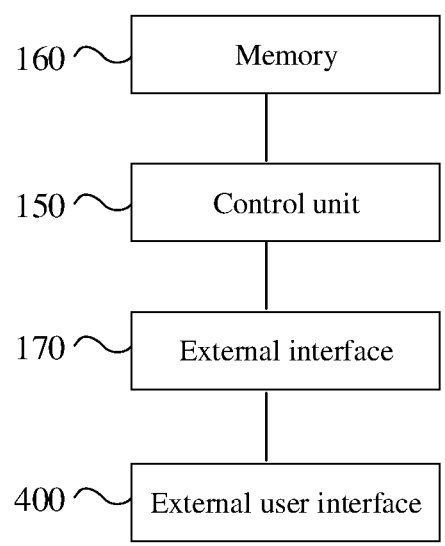
FIG. 3b is a schematic diagram of a calligraphy-painting device performing smart scoring and displaying provided by an embodiment of the present disclosure.

For example, FIG. 3b is a schematic diagram of a calligraphy-painting device performing smart scoring and displaying provided by the present embodiment. As illustrated by FIG. 3b, the calligraphy-painting device further includes an external interface 170, which is in communication connection with the control unit 150, and the control unit 150 sends a signal of the score to the external interface 170. For example, the external interface 170 is connected to a device such as a computer or a mobile phone on which an external client is installed, and transmits comparison data for the user to call. For example, upon the user completing the copy of a page of the calligraphy-painting image, all effective handwriting information of the page has been recorded. Upon the external user interface (UI) 400 being in communicating with the external interface 170 (e.g., universal serial bus (USB) or bluetooth, etc.) and the score and recorded information being read, the entire page of copybook will be displayed on the user interface and compared with the calligraphy-painting image (such as a comparison between a left part and a right part, or by setting transparency of the calligraphy-painting image and the effective handwriting information to overlap the two for comparison), so that the user can objectively understand their own level of calligraphy. For example, the external UI refers to a UI interface which is specially designed for the user on a device on which a client is installed, such as a computer or cellphone for displaying the score. The present embodiment includes but is not limited thereto.

In painting practice, the scoring and display of the calligraphy-painting image and effective handwriting information can employ the process shown in FIG. 3a and FIG. 3b, and the details are omitted herein.

For example, the control unit 150 is further configured to analyze the score to classify the writing conditions of each stroke written by the user. For example, the control unit 150 can classify and count the strokes of the effective handwriting information of the user, analyze the data of the strokes to obtain that which stroke the user writes (paints) well and which stroke the user writes (paints) poor. The analysis result can be displayed on the display portion. In addition, the analysis result can also be provided for the user to call and read in the external UI.

The calligraphy-painting device provided in the present embodiment can be located on a head wearing portion, or located on a desk or a chair, and the like, the present embodiment is not limited thereto.

Figure 4:
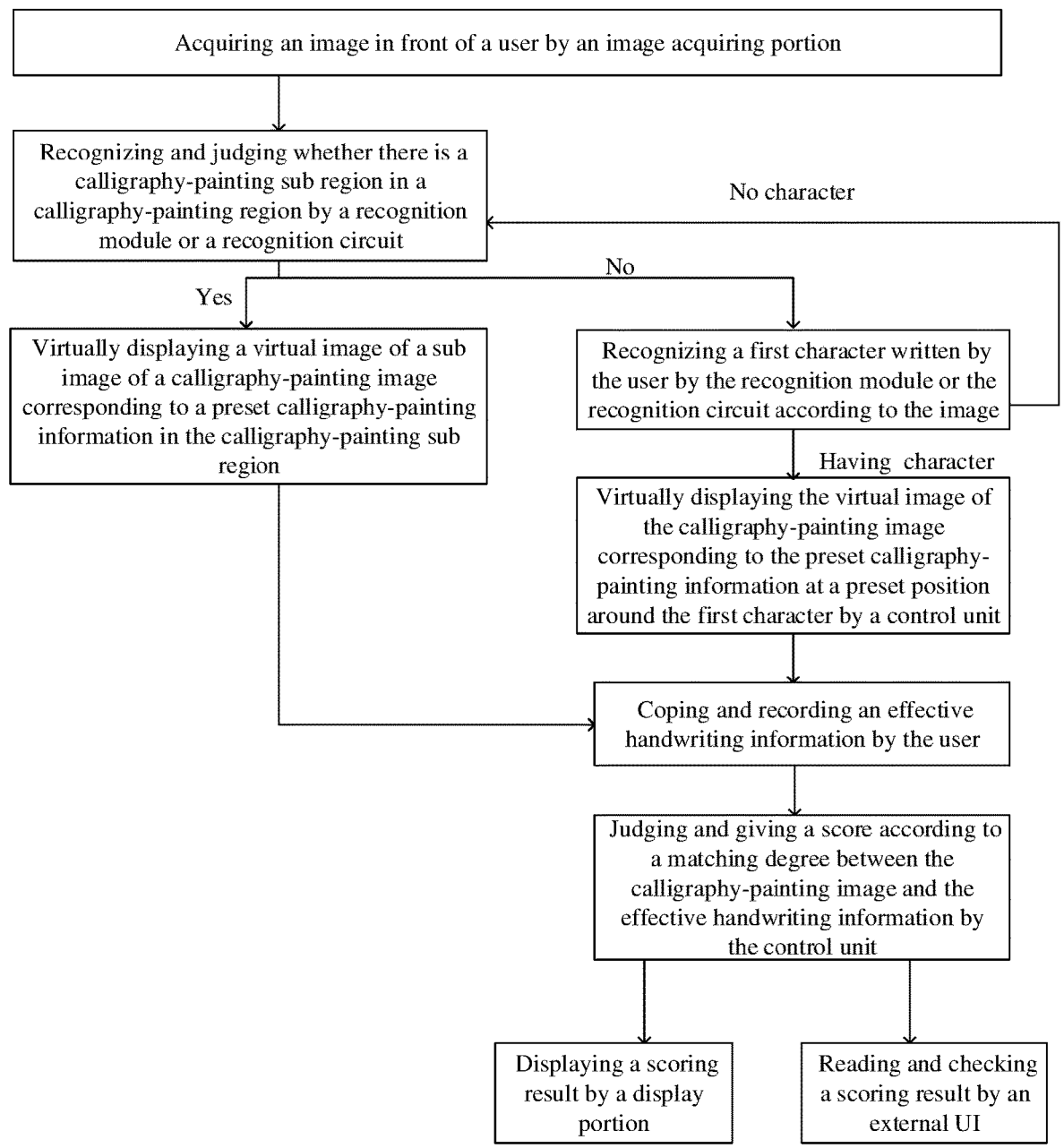
FIG. 4 is a schematic diagram of a main working flow of a calligraphy-painting device provided by an embodiment of the present disclosure.

For example, FIG. 4 is a schematic diagram of a main working flow of a calligraphy-painting device provided by the present embodiment. The main working flow of the calligraphy-painting device has been described in detail in the foregoing content, and is not described herein again. The augmented reality technology is applied to the calligraphy-painting device provided by the present embodiment. On the one hand, the user can copy the virtual image of the preset calligraphy-painting information virtually displayed in the calligraphy-painting region, and obtain objective evaluation and guidance in the process of repeated practice, thereby improving the practice experience and effect, and quickly improving the level of calligraphy-painting of the user; on the other hand, a suggestion of a next stroke can be provided during the process of practicing calligraphy, so as to prevent the user from writing with a wrong sequence.

Figure 5:
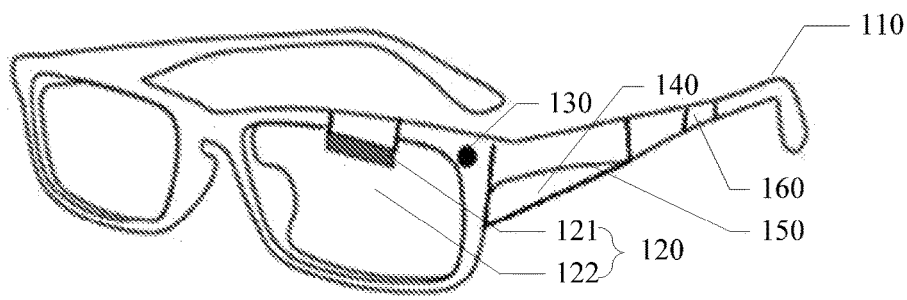
FIG. 5 is a schematic diagram of a calligraphy-painting apparatus provided by an embodiment of the present disclosure.

Another embodiment of the present disclosure provides a calligraphy-painting apparatus, and FIG. 5 shows a schematic diagram of the calligraphy-painting apparatus provided by the present embodiment. As illustrated by FIG. 5, the calligraphy-painting apparatus includes a head wearing portion 110 and the calligraphy-painting device provided by any one of the abovementioned embodiments. The calligraphy-painting device is located on the head wearing portion 110.

FIG. 5 is schematically described by taking a case where the head wearing portion 110 is a pair of glasses. However, the present embodiment is not limited thereto. For example, the head wearing portion can also be a device worn on a head of the user such as a helmet. FIG. 5 is described by taking a case where the calligraphy-painting device includes a separate recognition module or recognition circuit 140 as an example.

For example, upon the user wearing the head wearing portion 110, the display portion 120 and the image acquiring portion 130 are located in front of the head wearing portion 110. For example, upon the recognition module or the recognition circuit 140 being a separate part in the calligraphy-painting device, positions of the recognition module or the recognition circuit 140 and the control unit 150 are not limited in the present embodiment, for example, the recognition module or the recognition circuit 140 and the control unit 150 can be located in the front of the head wearing portion 110, the lateral surface of the head wearing portion 110, or in the interior of the head wearing portion 110, and the like.

For example, the recognition module or the recognition circuit can also be a part of the control unit or the image acquiring portion.

The calligraphy-painting apparatus provided by the present embodiment applies an augmented reality (AR) technology. On the one hand, the user can copy the virtual image of the preset calligraphy-painting information virtually displayed in the calligraphy-painting region, and obtain objective evaluation and guidance in the process of repeated practice, thereby improving the practice experience and effect, and quickly improving the level of calligraphy-painting of the user; on the other hand, a suggestion of a next stroke can be provided during the process of practicing calligraphy, so as to prevent the user from writing with a wrong sequence.

Figure 6A:
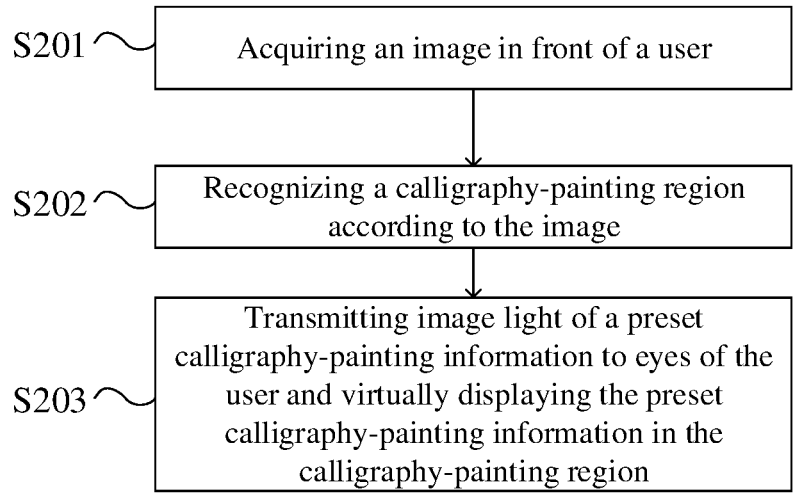
FIG. 6a to FIG. 6d are flowcharts of an auxiliary method for calligraphy-painting provided by an embodiment of the present disclosure.

Another embodiment of the present disclosure provides an auxiliary method for calligraphy-painting, and FIG. 6a to FIG. 6d are flowcharts of the auxiliary method for calligraphy-painting according to the present embodiment. For example, as illustrated by FIG. 6a, the specific steps include:

S201: acquiring an image in front of a user.

S202: recognizing a calligraphy-painting region according to the image.

S203: transmitting image light of a preset calligraphy-painting information to eyes of the user and virtually displaying the preset calligraphy-painting information in the calligraphy-painting region.

For example, a virtual image of the preset calligraphy-painting information is virtually displayed in the calligraphy-painting region.

For example, the image in front of the user can be acquired by an image acquiring portion.

For example, in an example of the present embodiment, a control unit is in communication connection with the image acquiring portion, and a recognition module or a recognition circuit included in the image acquiring portion can recognize the calligraphy-painting region according to the image.

For example, in an example of the present embodiment, the control unit is in communication connection with the image acquiring portion, and a recognition module or a recognition circuit included in the control unit can recognize the calligraphy-painting region according to the image.

For example, in an example of the present embodiment, a separate recognition module or a separate recognition circuit can be used to recognize the calligraphy-painting region according to the image. The recognition module or the recognition circuit in the present example can be respectively in communication connection with the image acquiring portion and the control unit.

The abovementioned recognition module refers that the recognition function is implemented by a software algorithm, so as to be executed by various types of processors. For example, considering the level of the existing hardware process, the recognition module can be a module implemented by a software algorithm.

The abovementioned recognition circuit refers to that the recognition function is implemented by hardware. Without considering the cost, a person having ordinary skill in the art can build a corresponding hardware circuit to realize the recognition function. For example, the hardware circuit includes a conventional Very Large Scale Integration (VLSI) circuit or a gate array and existing semiconductors such as a logic chip, a transistor, or other discrete elements. For example, the recognition circuit can also be implemented by a programmable hardware device such as a field programmable gate array, a programmable array logic, a programmable logic device, etc., but the present embodiment is not limited thereto.

For example, the preset calligraphy-painting information includes a calligraphy-painting image, for example, an image of calligraphy and painting.

For example, the preset calligraphy-painting information can be displayed in front of the user through a display portion.

For example, the control unit can be in communication connection with the display portion, and the control unit is configured to control the display portion to display the preset calligraphy-painting information, image light displayed by the display portion is transmitted to eyes of the user, and the virtual image of the preset calligraphy-painting information is virtually displayed in the calligraphy-painting region.

For example, the display portion can reflect the calligraphy-painting image into the eyes of the user, and the user can also see the calligraphy-painting region through the display portion. Therefore, the user can see the virtual image of the calligraphy-painting image virtually displayed in the calligraphy-painting region.

The auxiliary method for calligraphy-painting provided by the present embodiment utilizes the acquired image, recognizes the calligraphy-painting region in the image, then transmits the image light of the preset calligraphy-painting information to the eyes of the user, and virtually displays the virtual image of the preset calligraphy-painting information in the calligraphy-painting region, so that the user can see the virtual image of the preset calligraphy-painting information in the calligraphy-painting region, thereby achieving the augmented reality of the preset calligraphy-painting information and the real scene. The auxiliary method for calligraphy-painting applies an augmented reality (AR) technology to enable the user to copy the virtual image of the preset calligraphy-painting information virtually displayed in the calligraphy-painting region. During repeated practice, the level of calligraphy-painting of the user can be quickly improved.

Figure 6B:
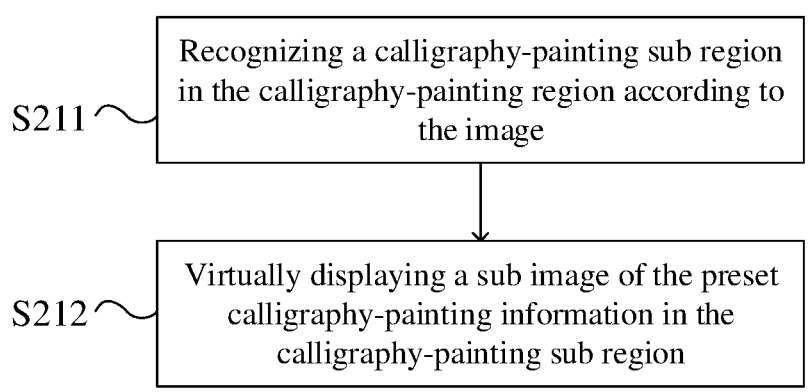

For example, as illustrated by FIG. 6b, the auxiliary method for calligraphy-painting provided in the present embodiment further includes:

S211: recognizing a calligraphy-painting sub region in the calligraphy-painting region according to the image.

For example, the abovementioned recognition module or recognition circuit can be used to recognize the calligraphy-painting sub region in the calligraphy-painting region according to the image. The present embodiment is not limited thereto. For example, it is also possible to recognize the calligraphy-painting sub region according to the image through another recognition module or recognition circuit.

S212: virtually displaying a sub image of the preset calligraphy-painting information in the calligraphy-painting sub region.

For example, a virtual image of the sub image of the preset calligraphy-painting information is virtually displayed in the calligraphy-painting sub region.

For example, the present embodiment is described by taking a case where the calligraphy-painting sub region is a frame pattern as an example, but is not limited thereto. For example, the calligraphy-painting sub region can also be shown in other patterns, for example, the calligraphy-painting sub region 201 can include a shadow square or a blank square, as long as it can be recognized by the recognition module or the recognition circuit. For example, upon the recognition module or the recognition circuit recognizing an outer frame with four orthogonal angles, it can be determined that the current region is the calligraphy-painting sub region (frame pattern), upon the recognition module or the recognition circuit recognizing that at least N (N can be set according to the practical requirement, for example, N>2) calligraphy-painting sub regions are repeated, it is determined that the current region is the calligraphy-painting region including the calligraphy-painting sub region.

For example, after the recognition module or the recognition circuit recognizes the calligraphy-painting sub region in the calligraphy-painting region, the recognition module or the recognition circuit sends a data signal to the control unit. The control unit virtually displays the virtual image of the sub image of the calligraphy-painting image in the calligraphy-painting sub region, so that the user can copy the virtual image of the sub image of the calligraphy-painting image, so as to practice calligraphy.

Figure 6C:
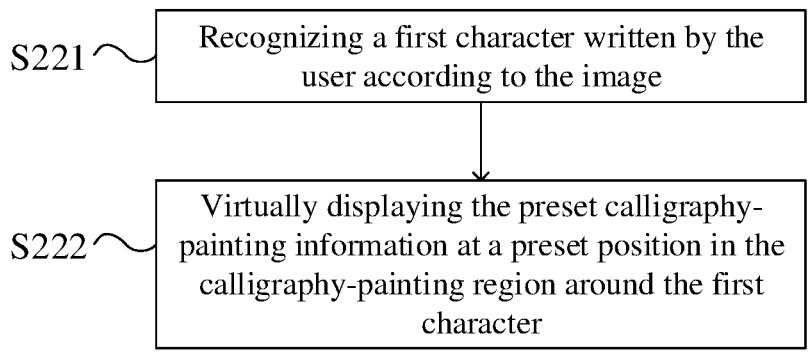

For example, as illustrated by FIG. 6c, the auxiliary method for calligraphy-painting provided in the present embodiment further includes:

S221: recognizing a first character written by the user according to the image.

S222: virtually displaying the preset calligraphy-painting information at a preset position in the calligraphy-painting region around the first character.

For example, a virtual image of the preset calligraphy-painting information is virtually displayed at the preset position in the calligraphy-painting region around the first character.

For example, the present example is described by taking a case where the user performs calligraphy practice as an example. In a case where the calligraphy-painting region is not provided with the calligraphy-painting sub region (for example, a word frame) therein, the recognition module or the recognition circuit is further configured to recognize the first character written by the user according to the image provided by the image acquiring portion. After the recognition module or the recognition circuit recognizes the first character written by the user, the recognition module or the recognition circuit transmits a data signal to the control unit, and the control unit sets a preset position around the first character, and then the control unit virtually displays the virtual image of the calligraphy-painting image at the preset position around the first character. The user can set the number and positions of the preset positions according to the practical requirements.

For example, the abovementioned method can also play an auxiliary role in the painting practice, which is not repeated herein.

Figure 6D:
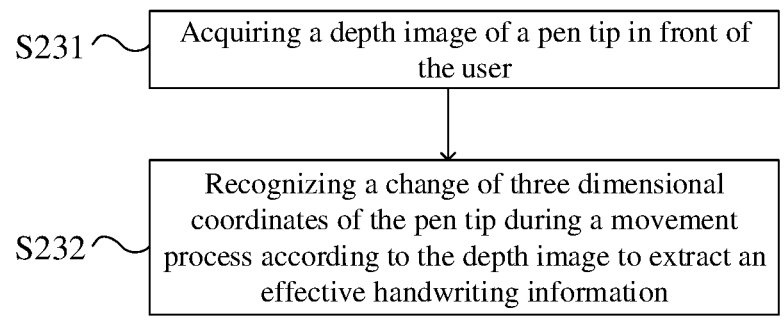

For example, as illustrated by FIG. 6d, the auxiliary method for calligraphy-painting provided in the present embodiment further includes:

S231: acquiring a depth image of a pen tip in front of the user.

S232: recognizing a change of three dimensional coordinates of the pen tip during a movement process according to the depth image to extract an effective handwriting information.

The effective handwriting information is a movement trajectory of the pen tip upon a distance between the pen tip and a writing carrier in the calligraphy-painting region being zero, and the movement trajectory falls into a predetermined region in the calligraphy-painting region, for example, a calligraphy-painting sub region. The abovementioned limitation that limiting the movement trajectory of the effective handwriting information within the calligraphy-painting sub region is to eliminate miswriting strokes, so as to better judge the writing conditions in the calligraphy-painting sub region (for example, a word frame). However, the miswriting strokes outside the calligraphy-painting sub region can also be regarded as a defect of calligraphy-painting. Therefore, the predetermined region for judging the effective handwriting information is not limited to the calligraphy-painting sub region, but can also be the entire calligraphy-painting region, or any part of the calligraphy-painting region.

For example, the auxiliary method for calligraphy-painting provided in the present embodiment further includes: highlighting a next stroke of the user according to the effective handwriting information. For example, the control unit can be configured that: in a process of extracting the effective handwriting information of the movement trajectories of the pen tip, the completed stroke in the currently written character is weakened or not displayed, and the next stroke to be written is highlighted (e.g., brightened, bolded, flickering) to remind the user of the next stroke, thereby achieving correcting the writing sequence and preventing the user from writing with a wrong sequence.

For example, the auxiliary method for calligraphy-painting provided in the present embodiment further includes: judging and giving a score according to a matching degree between the calligraphy-painting image corresponding to the preset calligraphy-painting information and the effective handwriting information.

For example, the present example is described by taking a case where the calligraphy-painting image is a calligraphy copybook as an example. After reading the calligraphy-painting image and the effective handwriting information, the control unit can compare each handwriting in the effective handwriting information with each character in the calligraphy copybook, and can give a score according to the matching degree between the two. The "matching degree" here refers to a degree of coincidence between each handwriting and each character in the calligraphy copybook. For example, upon the matching degree being between 80% and 85%, the score of the user can be set as 80 points; upon the matching degree being between 85% and 90%, the score of the user can be set as 85 points; upon the matching degree being between 90% and 95%, the score of the user can be set as 90 points, and upon the matching degree being between 95% and 100%, the score of the user can be set as 100 points, etc., the present embodiment is not limited thereto, the user can set the relationship between the score and matching degree according to their own conditions.

For example, by dividing the strokes of each handwriting in the effective handwriting information, it is also possible to give a score according to the degree of coincidence of each stroke in the effective handwriting information and each stroke in the calligraphy-painting image, and then take an average score of the scores of the strokes. For example, the scoring process of the stroke includes: the control unit divides the stroke into several categories according to the strokes of the common characters, such as: horizontal stroke (—), vertical stroke ( | ), leftfalling stroke ( ) ), rightfalling stroke ( \ ), horizontal hook stroke ( \ ), and horizontal leftfalling stroke ( ⁊ ), etc. Upon the user completing the writing of one character, the control unit records the scores of strokes, and records the historical scores of the last N times (such as 100 or 1000 times) of each stroke, so as to obtain a historical score curve, and compare the different strokes, thereby helping the user get their own calligraphy conditions.

For example, the auxiliary method for calligraphy-painting provided in the present embodiment further includes: projecting the score or outputting the score.

For example, the control unit can send a display signal of the score to the display portion to display a score result. For example, the score can be set to be displayed for each character, displayed as an average score of one line of characters, or displayed as an average score of one page of characters according to the habit of the user. The score is displayed by the display portion to be presented in front of the eyes of the user. No matter what kinds of the score is displayed, the control unit will compare and give a score for each character, and record the score.

For example, the control unit is further configured to send a signal of the score to an external interface. For example, upon the user completing the copy of a page of the calligraphy-painting image, all effective handwriting information of the page has been recorded. Upon the external user interface (UI) being in communicating with the external interface (e.g., universal serial bus (USB) or bluetooth, etc.) and the score and recorded information being read, the entire page of copybook will be displayed on the user interface and compared with the calligraphy-painting image (such as a comparison between a left part and a right part, or by setting transparency of the calligraphy-painting image and the effective handwriting information to overlap the two for comparison), so that the user can objectively understand their own level of calligraphy.

In painting practice, the scoring and display of the calligraphy-painting image and effective handwriting information can employ the abovementioned process, and the details are omitted herein.

For example, the auxiliary method for calligraphy-painting provided in the present embodiment further includes: analyzing the score to classify writing conditions of each stroke written by the user. For example, the control unit can analyze the score to classify the writing conditions of each stroke written by the user. For example, the control unit can classify and count the strokes of the effective handwriting information of the user, and analyze the data of the strokes to obtain that which stroke the user writes (paints) well and which stroke the user writes (paints) poor. The analysis result can be displayed on the display portion. In addition, the analysis result can also be provided for the user to call and read in the external UI.

The auxiliary method for calligraphy-painting provided by the present embodiment applies an augmented reality (AR) technology. On the one hand, the user can copy the virtual image of the preset calligraphy-painting information virtually displayed in the calligraphy-painting region, and obtain objective evaluation and guidance in the process of repeated practice, thereby improving the level of calligraphy-painting of the user; on the other hand, a suggestion of a next stroke can be provided during the process of practicing calligraphy, so as to prevent the user from writing with a wrong sequence.

Some embodiments according to the present disclosure further provide a calligraphy-painting device, the calligraphy-painting device includes: a processor; a memory; and computer program instructions stored in the memory. Upon the computer program instructions being executed by the processor, the steps involved in the abovementioned auxiliary method for calligraphy-painting are executed.

The following points should to be explained:

(1) Unless otherwise defined, in the embodiments and accompanying drawings in the present disclosure, the same reference numeral represents the same meaning.

(2) The accompanying drawings involve only the structure(s) in connection with the embodiment(s) of the present disclosure, and other structure(s) can be referred to common design(s).

(3) For the purpose of clarity, in accompanying drawings for illustrating the embodiment(s) of the present disclosure, layer(s) or region(s) may be enlarged. However, it should understood that, in the case in which a component or element such as a layer, film, region, substrate or the like is referred to be "on" or "under" another component or element, it may be directly on or under the another component or element or a component or element is interposed therebetween.

The foregoing is only the embodiments of the present invention and not intended to limit the scope of protection of the present invention, alternations or replacements which can be easily envisaged by any skilled person being familiar with the present technical field shall fall into the protection scope of the present disclosure. Thus, the protection scope of the present disclosure should be based on the protection scope of the claims.

What is claimed is:

1. A calligraphy-painting device, comprising:
a display portion, configured to display a preset calligraphy-painting information;
an image acquiring portion, configured to acquire an image; and
a control unit, in communication connection with the display portion, and configured to control the display portion to display the preset calligraphy-painting information,
wherein the image is processed to obtain a calligraphy-painting region, and the preset calligraphy-painting information is virtually displayed in the calligraphy-painting region,
wherein the calligraphy-painting device further comprises a recognition module or a recognition circuit, wherein the recognition module or the recognition circuit is configured to process the image acquired by the image acquiring portion to obtain the calligraphy-painting region, and
wherein the recognition module or the recognition circuit is further configured to recognize a first character according to the image, and the control unit is further configured to control the display portion to virtually display the preset calligraphy-painting information at a preset position in the calligraphy-painting region around the first character.

2. The calligraphy-painting device according to claim 1, wherein the recognition module or the recognition circuit is further configured to recognize a calligraphy-painting sub region in the calligraphy-painting region according to the image, the control unit is further configured to control the display portion to virtually display a sub image of the preset calligraphy-painting information in the calligraphy-painting sub region.

3. The calligraphy-painting device according to claim 1, wherein the image acquiring portion is further configured to acquire a depth image of a pen tip, and the recognition module or the recognition circuit is further configured to recognize a change of three dimensional coordinates of the pen tip during a movement process according to the depth image and send the change to the control unit to extract an effective handwriting information, the effective handwriting information is a movement trajectory of the pen tip upon a distance between the pen tip and a writing carrier in the calligraphy-painting region being zero, and the movement trajectory is in a predetermined region in the calligraphy-painting region.

4. The calligraphy-painting device according to claim 3, wherein the control unit is further configured to highlight a next stroke according to the effective handwriting information.

5. The calligraphy-painting device according to claim 4, further comprising:
an external interface, in communication connection with the control unit, wherein the control unit is further configured to judge and give a score according to a matching degree between the preset calligraphy-painting information and the effective handwriting information, and send a signal of the score to the external interface.

6. The calligraphy-painting device according to claim 4, further comprising: a memory, wherein at least one of the preset calligraphy-painting information and the effective handwriting information is stored in the memory.

7. The calligraphy-painting device according to claim 1, wherein the display portion comprises:
a projection component and a transflective component, wherein the projection component projects the preset calligraphy-painting information displayed by the display portion to the transflective component, and the transflective component reflects image light of the preset calligraphy-painting information projected by the projection component.

8. A calligraphy-painting apparatus, comprising:
a head wearing portion; and
a calligraphy-painting device, located on the head wearing portion,
wherein the calligraphy-painting device comprises the calligraphy-painting device according to claim 1.

9. The calligraphy-painting device according to claim 1, wherein the control unit is in communication connection with the image acquiring portion, the recognition module or the recognition circuit is comprised in the control unit or the image acquiring portion.

10. The calligraphy-painting device according to claim 1, wherein the recognition module or the recognition circuit is respectively in communication connection with the image acquiring portion and the control unit.

11. An auxiliary method for calligraphy-painting, comprising:
acquiring an image in front of a user;
recognizing a calligraphy-painting region according to the image;
transmitting image light of a preset calligraphy-painting information to an eye of the user and virtually displaying the preset calligraphy-painting information in the calligraphy-painting region;

recognizing a first character written by the user according to the image; and virtually displaying the preset calligraphy-painting information at a preset position in the calligraphy-painting region around the first character.

12. The auxiliary method for calligraphy-painting according to claim 11, further comprising:

recognizing a calligraphy-painting sub region in the calligraphy-painting region according to the image; and virtually displaying a sub image of the preset calligraphy-painting information in the calligraphy-painting sub region.

13. The auxiliary method for calligraphy-painting according to claim 11, further comprising:

acquiring a depth image of a pen tip in front of the user; and recognizing a change of three dimensional coordinates of the pen tip during a movement process according to the depth image to extract an effective handwriting information, wherein the effective handwriting information is a movement trajectory of the pen tip upon a distance between the pen tip and a writing carrier in the calligraphy-painting region being zero, and the movement trajectory is in a predetermined region in the calligraphy-painting region.

14. The auxiliary method for calligraphy-painting according to claim 13, further comprising:

highlighting a next stroke of the user according to the effective handwriting information.

15. The auxiliary method for calligraphy-painting according to claim 13, further comprising:

judging and giving a score according to a matching degree between the preset calligraphy-painting information and the effective handwriting information.

16. The auxiliary method for calligraphy-painting according to claim 15, further comprising: projecting the score or outputting the score.

17. The auxiliary method for calligraphy-painting according to claim 15, further comprising: analyzing the score to classify writing conditions of each stroke written by the user.

* * * * *

UNITED STATES PATENT AND TRADEMARK OFFICE
CERTIFICATE OF CORRECTION

| | | |
|---|---|---|
| PATENT NO. | : 11,107,254 B2 | Page 1 of 1 |
| APPLICATION NO. | : 16/088624 | |
| DATED | : August 31, 2021 | |
| INVENTOR(S) | : Xinxin Mu | |

It is certified that error appears in the above-identified patent and that said Letters Patent is hereby corrected as shown below:

On the Title Page

Item (54) and in the Specification, Column 1, Lines 1-4, please change:
"CALLIGRAPHY-PAINTING DEVICE, CALLIGRAPHY-PAINTING APPARATUS, AND AUXILIARY METHOD FOR CALLIGRAPHY PAINTING"
To read correctly:
--CALLIGRAPHY-PAINTING DEVICE, CALLIGRAPHY-PAINTING APPARATUS, AND AUXILIARY METHOD FOR CALLIGRAPHY-PAINTING--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*